(12) United States Patent
Beach et al.

(10) Patent No.: US 11,978,247 B2
(45) Date of Patent: May 7, 2024

(54) ADVERSARIAL MASKS FOR SCENE-CUSTOMIZED FALSE DETECTION REMOVAL

(71) Applicant: ObjectVideo Labs, LLC, Tysons, VA (US)

(72) Inventors: Allison Beach, Leesburg, VA (US); Gang Qian, McLean, VA (US); Eduardo Romera Carmena, Madrid (ES)

(73) Assignee: ObjectVideo Labs, LLC, Tysons, VA (US)

( * ) Notice: Subject to any disclaimer, the term of this patent is extended or adjusted under 35 U.S.C. 154(b) by 269 days.

(21) Appl. No.: 17/517,114

(22) Filed: Nov. 2, 2021

(65) Prior Publication Data

US 2022/0147749 A1 May 12, 2022

Related U.S. Application Data

(60) Provisional application No. 63/112,800, filed on Nov. 12, 2020.

(51) Int. Cl.
*G06V 10/98* (2022.01)
*G06V 10/70* (2022.01)
(Continued)

(52) U.S. Cl.
CPC .............. *G06V 10/98* (2022.01); *G06V 10/70* (2022.01); *G06V 10/774* (2022.01); *G06V 20/20* (2022.01); *G06V 20/52* (2022.01)

(58) Field of Classification Search
CPC ...... G06V 10/98; G06V 10/70; G06V 10/774; G06V 10/82; G06V 10/25; G06V 20/20; G06V 20/52
See application file for complete search history.

(56) References Cited

U.S. PATENT DOCUMENTS 7,620,266 B2 11/2009 Brown et al.
8,189,049 B2 5/2012 Lopota et al.
(Continued)

OTHER PUBLICATIONS

Tang et al., Uldor: A Universal Lesion Detector for CT Scans with Pseudo Masks and Hard Negative Example Mining (Year: 2019).*
(Continued)

*Primary Examiner* — John B Strege
(74) *Attorney, Agent, or Firm* — Fish & Richardson P.C.

(57) ABSTRACT

Methods, systems, and apparatus, including computer programs encoded on a computer storage medium, for receiving multiple images from a camera, each image of the multiple images representative of a detection of an object within the image. For each image of the multiple images the methods include: determining a set of detected objects within the image, each object defined by a respective bounding box, and determining, from the set of detected objects within the image and ground truth labels, a false detection of a first object. The methods further include determining that a target object threshold is met based on a number of false detections of the first object in the multiple images, generating, based on the number of false detections for the first object meeting the target object threshold, an adversarial mask for the first object, and providing, to the camera, the adversarial mask.

20 Claims, 7 Drawing Sheets

(51) Int. Cl.
*G06V 10/774* (2022.01)
*G06V 20/20* (2022.01)
*G06V 20/52* (2022.01)

(56) References Cited

U.S. PATENT DOCUMENTS

| | | | | |
|---|---|---|---|---|
| 8,345,921 | B1* | 1/2013 | Frome | G06V 20/56 |
| | | | | 382/105 |
| 9,454,819 | B1 | 9/2016 | Seetharaman et al. | |
| 11,048,958 | B1* | 6/2021 | Qian | G06F 18/214 |
| 11,151,391 | B2* | 10/2021 | Viswanathan | G06V 20/56 |
| 11,176,403 | B1* | 11/2021 | Singh | G06V 10/82 |
| 2020/0302246 | A1* | 9/2020 | Shen | G06F 18/2178 |
| 2020/0334471 | A1* | 10/2020 | Zhang | G06V 20/52 |
| 2021/0300433 | A1* | 9/2021 | Vorobeychik | G06V 10/751 |
| 2021/0406589 | A1* | 12/2021 | Yadav | G06V 10/772 |

OTHER PUBLICATIONS

Lin et al., Dual-NMS: A Method for Autonomously Removing False Detection Boxes from Aerial Image Object Detection Results. (Year: 2019).*

Dhamija et al. The Overlooked Elephant of Object Detection: Open Set (Year: 2020).*

\* cited by examiner

ADVERSARIAL MASKS FOR SCENE-CUSTOMIZED FALSE DETECTION REMOVAL

CROSS-REFERENCE TO RELATED APPLICATION

This application claims the benefit of U.S. Provisional Application No. 63/112,800, filed on Nov. 12, 2020, the contents of which are incorporated by reference herein in its entirety.

BACKGROUND

Many properties are equipped with monitoring systems that include sensors and connected system components.

SUMMARY

In general, the subject matter described in this disclosure can be embodied in methods, apparatuses, and systems that generate masks used for false detection removal.

In general, adversarial techniques were traditionally conceived to attack or reduce the quality or accuracy of object detection. Object detection model(s) on a camera can capture and detect objects within a field of view of the camera. False alarm background objects (FABOs), e.g., trees, mailboxes, fountains, etc., can be a source of false positive detections where the object detection model may incorrectly detect a FABO as an object of interest. Techniques are described herein for determining target regions including FABOs within a field of view of a camera that are sources of false positive detections. The areas defining the respective target regions are optimized over a set of multiple images to increase removal of false positive detections due to FABOs while decreasing the impact on true positive detections, where each target region can be an average overlap of areas from images that result in false positive detections. Once the target regions are defined, the target regions can be utilized as a basis for an initial adversarial mask. In some implementations, pixel values for the pixels included in the target regions may be adjusted to generate an adversarial mask that better reduces false positive detections.

An adversarial mask is provided to the camera to utilize during operation by generating an adversarial auxiliary image. The input image is modified by changing values of one or more elements within the input image such as pixels or groups of pixels. The values are changed to produce a corresponding change in the results of a detection algorithm performed on the input image. The adversarial auxiliary image generated using the adversarial mask and the captured image by the camera can prevent an object detection model for the camera from detecting a FABO in the image, thereby reducing false positive detections without necessarily altering the object detection model on the camera.

One innovative aspect of the subject matter described in this specification is embodied in a method that includes receiving multiple images from a camera, each image of the multiple images representative of a detection of an object within the image. For each image of the multiple images the methods include: determining a set of detected objects within the image, each object defined by a respective bounding box, and determining, from the set of detected objects within the image and ground truth labels, a false detection of a first object. The methods further include determining that a target object threshold is met based on a number of false detections of the first object in the multiple images, generating, based on the number of false detections for the first object meeting the target object threshold, an adversarial mask for the first object, and providing, to the camera, the adversarial mask.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. In some implementations, determining that the target object threshold is met based on the number of false detections of the first object includes, for each determined false detection of the first object: incrementing a target object count for the first object within the image, and determining the target object count for the first object meets a target object threshold.

In some implementations, incrementing a target object count for the first object within the image includes incrementing pixel counts for pixels in a pixel region corresponding to a bounding box defining the first object. In some implementations, determining the target object count for the first object meets the target object threshold includes determining that pixels within the pixel region meet a threshold pixel count, and generating, based on the target object count for the first object meeting the target object threshold, the adversarial mask for the first object can include determining, based on the pixels within the pixel region meeting the threshold pixel count, a target region for the first object, and generating the adversarial mask including the target region.

In some implementations, incrementing a target object for the first object within the image includes: determining, from multiple candidate objects, a candidate object including a bounding box with a threshold overlap with a bounding box of the first object, and incrementing a count for the candidate object. Determining the target object count for the first object meets the target object threshold can include determining the count for the candidate object meets a threshold count, and generating, based on the target object count for the first object meeting the target object threshold, the adversarial mask for the first object can include determining, based on bounding boxes corresponding to each appearance of the candidate object meeting the threshold count in the multiple images, a target region for the candidate object, and generating the adversarial mask including the target region.

In some implementations, the methods further include receiving, from the camera, a second set of multiple images, applying, to a first image of the second set of multiple images, the adversarial mask including an adversarial mask parameter, where applying the adversarial mask to the first image includes modifying one or more pixels of the first image to generate a first auxiliary image, determining, for the first auxiliary image, a gradient and a sign of the gradient, generating, based on the gradient and the sign of the gradient and from the adversarial mask, an updated adversarial mask. Updating the adversarial mask includes: applying the adversarial mask to a second image of the second set of multiple images, and updating the adversarial mask parameter, and providing, to the camera, the updated adversarial mask.

Particular embodiments of the subject matter described in this specification can be implemented so as to realize one or more of the following advantages. Adversarial masks can be utilized to reduce false positive detections triggered by objects that are not of interest within a field of view of a camera. Target objects in images captured by a camera can be identified as sources of false detections and can be used to generate an adversarial mask on a per-image basis, on a per-clip basis, or a per-camera basis. The identification of target objects can be performed in an automatic or semi-automatic manner, reducing cost to process and generate an adversarial mask for a camera. An initial adversarial mask can be set as a learnable parameter, where an iterative optimization process can be performed on the initial adversarial mask for multiple images including multiple imaging conditions for a camera, e.g., different lighting, seasons, weather, etc., and can result in a robust adversarial mask that can have minimal impact on true positive detections while maximally reducing false positive detections.

The details of one or more embodiments of the invention are set forth in the accompanying drawings and the description below. Other features and advantages of the invention will become apparent from the description, the drawings, and the claims.

DETAILED DESCRIPTION

Figure 1:
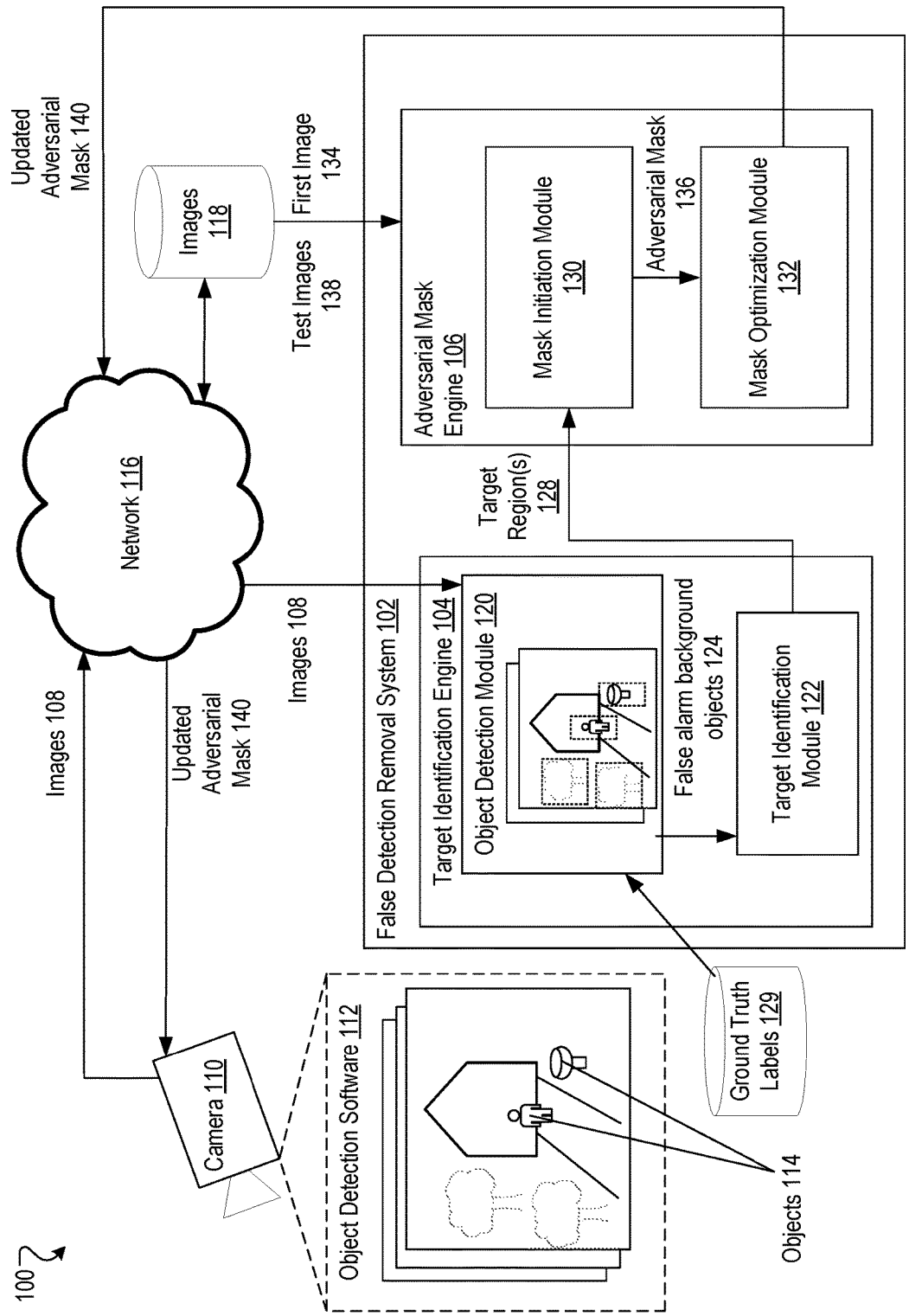
FIG. 1 is a diagram depicting an example operating environment of a false detection removal system.

FIG. 1 is a diagram depicting an example operating environment 100 of a false detection removal system 102. False detection removal system 102 can be hosted on one or more local servers, a cloud-based service, or a combination thereof. False detection removal system 102 includes a target identification engine 104 and an adversarial mask engine 106. Though described here as a target identification engine 104 and adversarial mask engine 106, the processes performed by each can be performed by more or fewer engines as part of the false detection removal system 102.

The system 102 can receive images 108 from a camera 110 as input. Camera 110 can be a surveillance camera located on a property, e.g., a home, and oriented to capture a scene within a field of view of the camera 110. Camera can include object detection software 112 to detect objects 114 within clips, e.g., video clips, and/or images captured by the camera 110 of the scene.

In some implementations, images 108 from the camera 110 can include representative images from clips captured by camera 110 within a field of view of the camera 110. For example, camera 110 can capture a clip of a delivery truck passing through the field of view of camera 110 and a representative image including the delivery truck is selected for the clip. The captured images 108 can be processed by object detection software 112. Object detection software 112 can be located on camera 110 and/or on a cloud-based server and can process the captured images 108 to detect one or more objects within the captured images 108, e.g., people, animals, vehicles, etc.

In some implementations, object detection software 112 can detect that one or more objects 114 appear within the captured image 108 and provide the captured image 108 to the false detection removal system 102 via a network 116.

In some implementations, object detection software 112 can include one or more machine-learned models for identifying and classifying objects within the scene. For example, object detection software 112 can include facial recognition software, human/animal models, and the like. Object detection software 112 can detect one or more objects within an image, set of images, or clips captured by camera 110.

Network 116 is configured to enable the exchange of electronic communications between camera 110 and the system 102. The network 116 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. Network 116 may include multiple networks or subnetworks, each of which may include, for example, a wired or wireless data pathway. The network 116 may include a circuit-switched network, a packet-switched data network, or any other network able to carry electronic communications (e.g., data or voice communications). For example, the network 116 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 116 may include one or more networks that include wireless data channels and wireless voice channels. The network 116 may be a wireless network, a broadband network, or a combination of networks includes a wireless network and a broadband network.

In some implementations, images 108 from camera 110 can be provided to the false detection removal system 102 as they are captured. Images 108 can additionally or alternatively be stored in an image database 118, e.g., on a cloud-based server, on a camera-based data storage, or an edge-based device, and can be provided to and/or accessed by the false detection removal system 102. For example, camera 110 can upload captured images 108 in image database 118 and false detection removal system 102 can request images 108 from the image database 118 in the process of generating an adversarial mask.

Target identification engine 104 includes an object detection module 120 and a target identification module 122. Through described here as object detection module 120 and target identification module 122, the processes described can be performed by more or fewer modules.

Object detection module 120 receives images 108 as input. As described above, images 108 can be provided by camera 110 via network 116. Additionally, or alternatively, images 108 can be received by the object detection module 120 from image database 118 via the network 116.

Object detection module 120 can detect, using one or more machine-learned models, objects within each image

108 of a set of images. The object detection module can further identify, by multiple classifiers, the objects appearing in each image 108 of a set of images, and provide the FABOs 124 as output to the target identification module 122. The target identification module 122 can be located on a cloud-based server, on the camera, or an edge device.

In some implementations, ground truth labels 126 can be applied to each of the objects 114 detected within each image 108. Each object can be annotated with a ground truth label 126 in an automatic, semi-automatic, or manual manner. For example, objects may be annotated with ground truth labels by a human expert, e.g., "tree, fountain, flag, car, human, animal." In some implementations, the objects may be annotated with ground truth labels using user feedback, e.g., where a homeowner can define a bounding box as a false positive detection.

The annotated objects that are not of interest, e.g., false alarm background objects (FABOs), can be identified from the annotated objects. Images including the FABOs can be identified, and the object detection module 120 can output the FABOs 124. FABOs 124 can include objects determined to be sources of false positive detections. In other words, objects identified within an image 108 and annotated with ground truth labels can be identified as FABOs 124 as potential sources of false positive detections by camera 110. For example, an image can include annotated objects "tree" and "fountain" which are examples of false alarm background objects and can result in a determination that the image is a false positive detection. The objects identified in the image 108, e.g., "tree" and "fountain," are then output as FABOs 124 as possible sources of false positive detections.

In some implementations, FABOs 124 include coordinates for each false detection detected within the image 108. For example, the object detection module 120, which can be a form of deep object detector, obtains one or more coordinates that correspond to one or more of the FABOs 124. The FABOs 124 can include coordinates as well as a classifier for each detection. In some cases, a false detection object class can be used to distinguish the FABOs 124 from objects detected in true positive detection images 108.

In some implementations, a first false positive detection includes the false detection object class, a first x coordinate, a first y coordinate, a second x coordinate, and a second y coordinate in a given two-dimensional (2D) x-y plane of the image 108. The first x coordinate and the first y coordinate correspond to a corner of a bounding box that bounds a first false detection. The second x coordinate and the second y coordinate correspond to another corner of a bounding box that bounds the first false detection.

In some implementations, other shapes or identifiers are used to label or define the FABOs 124. For example, instead of boxes with at least four values corresponding to a first x and y coordinate pair and a second x and y coordinate pair, an oval can be used. A center coordinate point together with a radius length on either the semi-major or semi-minor axis or both can be included. Other common shapes including polygons can be used such as circles, triangles, pentagons, among others.

In some implementations, buffers around bounding shapes can be used. In some cases, shapes can be specified using pixel values or ranges. Bounding shapes can include absolute or relative buffers around particular regions of images. For example, a 2 percent pixel buffer for a rectangular bounding box around a tree can be used to fully capture the tree. Similarly, an absolute buffer of 3 pixels on each of the four sides of the rectangular bounding box can be used to fully capture the tree.

In some implementations, a shape informed by a process similar to the object detection module 120 is used to label or define the FABOs 124. For example, a tree shown in the image 108 can be detected and a bounding box that labels or defines the detected tree can resemble the shape of the detected tree. In this way, bounding boxes can be dynamic and approximate the shape or appearance of elements which they bound.

In some implementations, FABOs 124 can be representative of objects that result in false positive detections under different imaging conditions by the camera 110. For example, FABOs 124 can differ under various lighting conditions, e.g., day vs night, weather conditions, e.g., sunny vs. cloudy, and/or seasonal conditions, e.g., fall vs spring. In one example, a tree object within a field of view of a camera can be a FABO under rainy and windy conditions (due to moving branches triggering the camera), but may not be a FABO under sunny, temperate conditions.

Target identification module 122 can receive the FABOs 124 as input and provide, as output, target regions 128. Target regions 128 represent areas of a scene within the field of view of the camera 110 that are determined to be sources of false positive detections, and which can include at least a portion of a FABO 124. Further details of the target identification module 122 are discussed below with reference to FIGS. 2A and 2B.

Adversarial mask engine 106 receives target regions 128 as input. Adversarial mask engine 106 includes a mask initiation module 130 and a mask optimization module 132. Though described here as mask initiation module 130 and mask optimization module 132, the processes described can be performed by more or fewer modules.

Mask initiation module 130 receives the target regions 128 and a first image 134 as input and generates, from the target regions 128 and for the first image 134, an adversarial mask 136. First image 134 can be an image of the set of images 108 from image database 118. Adversarial mask 136 is provided by the mask initiation module 130 as output.

Mask optimization module 132 receives adversarial mask 136 and a set of test images 138 as input, and performs an iterative optimization process to generate an updated adversarial mask 140, as output. Further details of the operations of the adversarial mask engine 106 are discussed below with reference to FIG. 4.

Updated adversarial mask 140 is provided to the camera 110. The updated adversarial mask 140 is utilized by the camera to alter the images captured by the camera 110. In other words, the update adversarial mask 140 will prevent the object detection software 112 of the camera 110 from detecting the FABOs within the field of view of the camera 110. For example, the updated adversarial mask 140 will alter one or more pixels of the FABO such that one or more neural networks and/or machine learned models of the object detection software 112 will not recognize a pattern that may lead to object detection of the FABO.

Figure 2A:
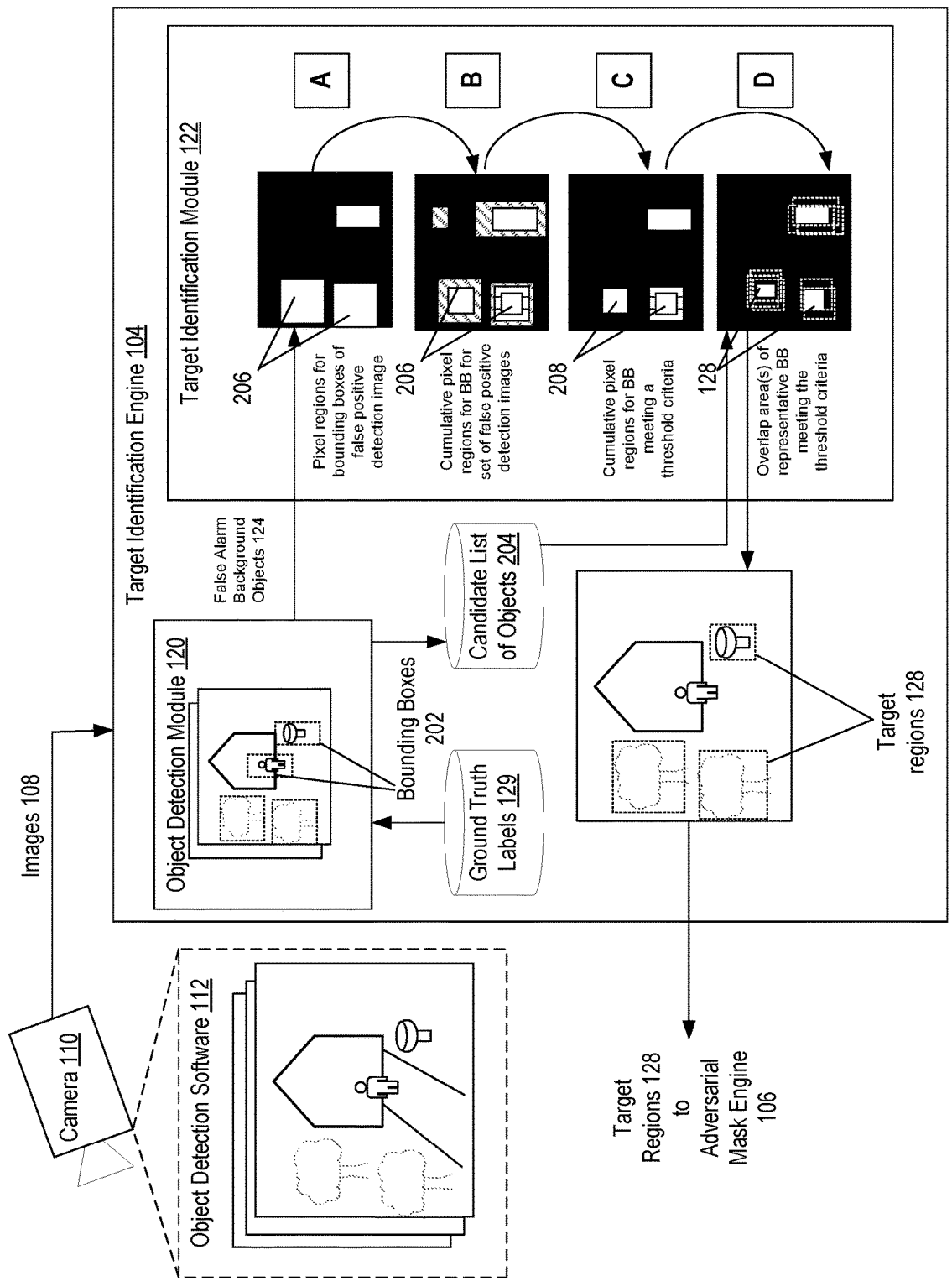
FIG. 2A is a diagram of an example target identification engine of the adversarial mask system.
Figure 2B:
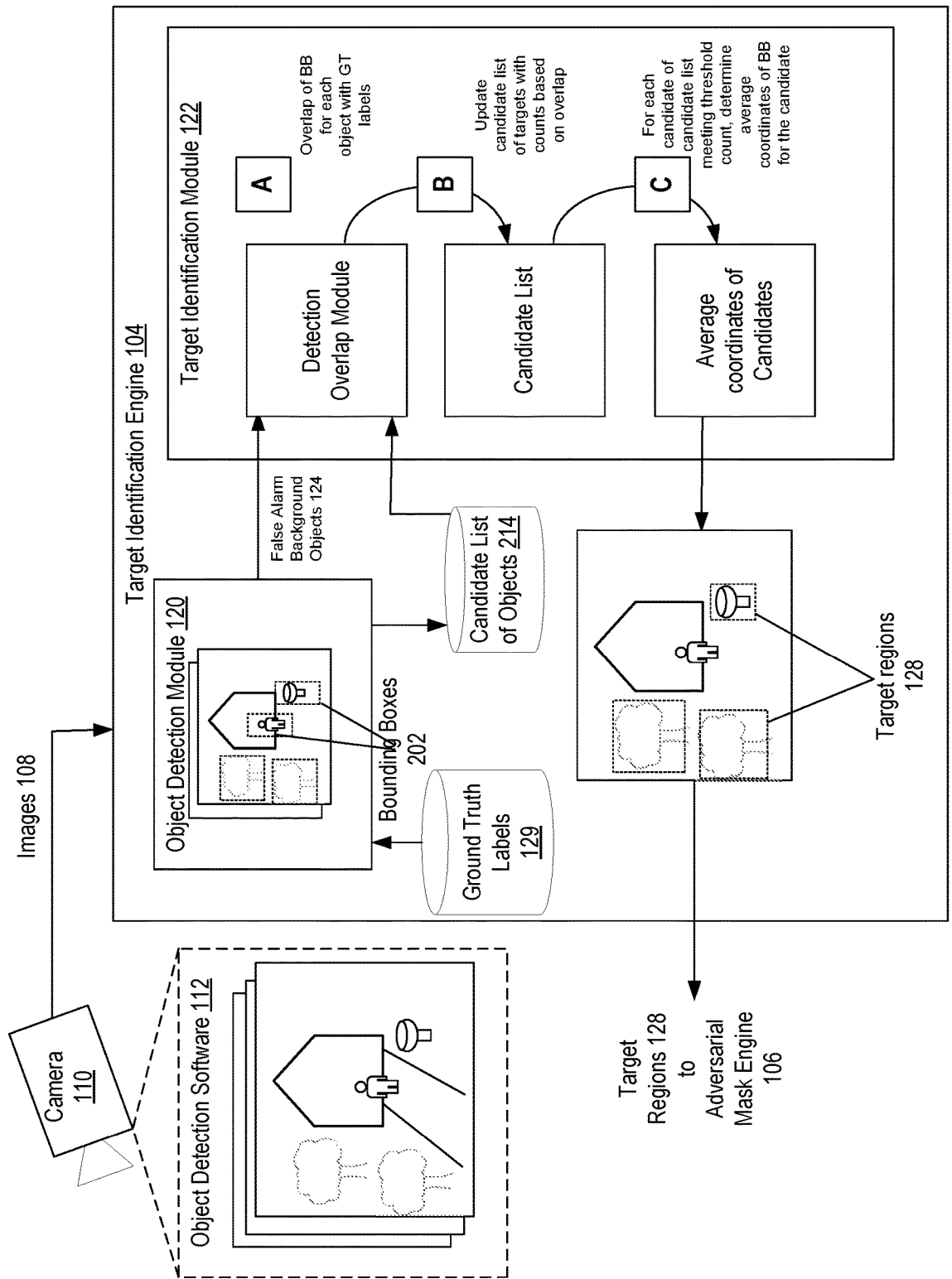
FIG. 2B is a diagram of another example target identification engine of the adversarial mask system.

FIGS. 2A and 2B are diagrams of example processes of the target identification engine of the adversarial mask system. As described above with reference to FIG. 1, target identification engine 104 can receive, images 108 from a camera 110 as input. Each image 108 of the images 108 from the camera 110 can be representative of a detection by the camera 110, e.g., a detection of one or more objects 114 within the field of view of the camera 110. Object detection module 120 receives the images 108 and can identify a set of false alarm background images (FABOs) 124 as output. In some implementations, as depicted in FIG. 2A, the object detection module 120 can utilize a one or more machine-learned models to generate a set of bounding boxes 202 for each image 108, where each bounding box 202 captures an object 114 detected within the image 108.

Each object 114 identified by a bounding box 202 can be annotated by a ground truth label 129, e.g., by a human expert, by an end user, or in an automatic/semi-automatic manner, to generate a set of annotated objects. Images 108 including annotated objects that are not of interest can be labeled as false positive detections. The identified annotated objects in each image 108 that is determined to be a false positive detection can be added to a candidate list of objects 204 that are potential FABOs 124.

FABOs 124 are provided as input to the target identification module 122. As described above, FABOs 124 can include bounding boxes and a set of coordinates for the bounding boxes 202, where the bounding box 202 and set of coordinates can define a pixel region including a set of pixels. In Stage A, pixel regions 206 for each of the bounding boxes 202 for the FABOs 124 for a first image that is a false detection are identified.

In Stage B, the target identification module adds, for each of multiple additional images from a set of images, pixel regions 206 for bounding boxes 202 for FABOs 124 in the multiple additional images to a cumulative pixel count for each identified pixel region 206 in a pixel count matrix. In some implementations, the pixel count matrix is initialized to have a size corresponding to the size of the image 108 used by the system 102, e.g., 480×480. The pixel count matrix can be initialized with all pixel values equal to zero, where each false positive detection increases corresponding pixels in pixel regions by increments of 1.

In Stage C, the target identification module 122 identifies pixel sub-regions 208, e.g., seed regions, meeting a threshold pixel count. The pixel sub-regions 208 can include a portion or all of a pixel region 206, e.g., can be a central portion of the pixel region 206. In one example, a pixel sub-region 208 can include a smaller number of pixels from an area of pixels defined by pixel region 206. A threshold pixel count can be any integer number, and can be a percentage of the total number of frames that there are in the camera 110. In one example, 30% of the total frames of the camera videos can be used to create the matrix, e.g., if a camera video has 1000 frames in total, 300 can be set as the threshold. Thus, if there is an area where the pixel counts in the matrix pass a value of 300 they will pass, otherwise any area with pixels under 300 will be discarded.

In some implementations, a threshold pixel count can be defined relative to an average pixel count for each pixel region 206.

In Stage D, the target identification module 122 identifies candidates from the candidate list of objects 204, e.g., a FABO, including bounding boxes 202 for each respective candidate that overlap with pixel sub-regions 208. The module 122 selects, from the candidate list of object 204, a set of candidates, e.g., FABOs, with respective bounding boxes 202 that overlap each pixel sub-region 208. In one example, the set of candidates is at least 20 candidates, at least 10 candidates, at least 30 candidates. In another example, the set of candidates includes candidates that have at least a threshold area overlap between an area of the pixel sub-region 208 and a respective area of the bounding box for the candidate, e.g., at least 50%, at least 75%, at least 95%. In another example, the set of candidates includes a particular number of candidates of all the candidates overlapping with the pixel sub-region having the most area overlap between the area of the pixel sub-region 208 and the respective area of the bounding box 202 for the candidate, e.g., a set of 20 candidates having the most overlap compared to the candidates, a set of 10 candidates having the most overlap compared to the candidates, etc., for the particular pixel sub-region 208.

The target identification module 122 determines, from the bounding boxes 202 of the set of candidates overlapping the pixel sub-region 208, a target region 128 that is an area of overlap of the bounding boxes 202. Target regions 128 can include, for example, a tree, fountain, flag, or another object that is not of interest to a user, e.g., homeowner. The target identification module 122 provides the target regions 128, as discussed above with reference to FIG. 1, to the adversarial mask engine 106.

FIG. 2B is a diagram of another example process of the target identification engine of the adversarial mask system. As described with reference to FIG. 2A, the object detection module 120 receives images 108 from camera 110 as input and provides, false alarm background objects 124 as output. In some implementations, as depicted in FIG. 2B, target identification module 122 receives the FABOs 124 as input. In Stage A, a detection overlap module 212 determines if a bounding box 202 corresponding to a received FABO 124 overlaps with a candidate object including a ground truth label in a stored list of candidate objects 214. For example, the detection overlap module 212 receives a FABO that is a tree with a particular bounding box. The detection overlap module 212 checks if the bounding box for the FABO overlaps with a candidate object including a bounding box and labeled with a ground truth label "tree."

In Stage B, the target identification module updates the stored list of the candidate objects 214, based on whether the bounding box 202 for the FABO overlaps with a candidate object in the stored list of candidate objects 214. Updating the stored list of the candidate objects 214 includes storing bounding box coordinates for each candidate object processed by the target identification module 122. If the bounding box 202 of the FABO is determined to overlap with a candidate object in the stored list of candidate objects 214, then the target identification module increments a count for the particular candidate object and stores the bounding box coordinates for the FABO 124 with the particular candidate object. If the bounding box of the FABO is determined to not overlap with a candidate object, then the target identification module adds a new candidate object including bounding box coordinates to the stored list of candidate objects 214 to represent the FABO.

In Stage C, the target identification module 122 identifies each candidate object in the stored list of candidate objects 214 that meets a threshold count, e.g., a threshold number of false positive detections for the candidate object. In other words, each candidate object that is identified as a FABO in a threshold number of images 108 provided by the camera, is identified by the target identification module 122. In some implementations, a percentage number of a total number of frames, e.g., images 108, from the camera 110 is used as the threshold count. For example, 30% of the total frames of the camera can be used as the threshold count.

For each of the identified candidate objects meeting the threshold count, an average of bounding box coordinates for each instance of the identified candidate object as one or more FABO 124 identified in images 108 is determined. The average coordinates of the object candidates generates target regions 128. The target identification module 122 outputs the target regions 128 to the adversarial mask engine 106.

Figure 3A:
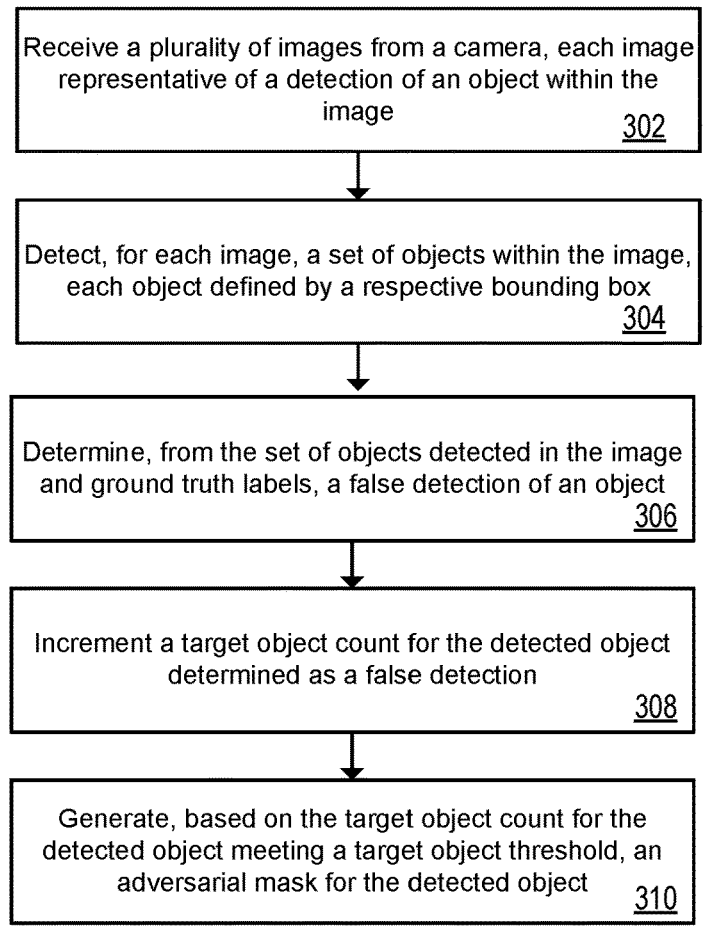
FIG. 3A is a flow diagram illustrating an example of a process of the adversarial mask system.

FIG. 3A is a flow diagram illustrating an example of a process 300 of the adversarial mask system. The system receives multiple images from a camera, each image representative of a detection of an object within the image (302). In some implementations, as depicted in FIG. 1, the system 102 receives multiple images 108 from camera 110, where each image 108 represents a detection of an object and/or event, e.g., person, animal, vehicle, etc., within the image 108. Images 108 can be stored in an image database 118, e.g., on a cloud-based server, and accessible by the system 102 via network 116.

In some implementations, one or more of the images 108 can be a representative image for a respective clip, e.g., video recording, by the camera 110. A representative image for a respective clip can be an image capturing one or more objects and/or events that triggered the capturing of the clip. In one example, camera 110 can be triggered to capture a clip by a person walking through the field of view of the camera 110, where a representative image for the clip includes the person in the frame.

The multiple images 108 can include false positive detections and true positive detections. A false positive detection can include where an object detected in an image is incorrectly detected, for example, where the camera is triggered to capture images/video clips by objects that are not of interest, e.g., a fountain, a mailbox, etc., within a field of view of the camera. A true positive detection can include an image where an object detected is correctly detected, for example, where the camera is triggered to capture images/video clips by an object of interest, e.g., a human, within the field of view of the camera. The objects within the images 108 can be identified by the object detection software 112 on camera 110, e.g., using multiple classifiers and/or machine-learned models.

For each image, the system detects a set of objects within the image, each object defined by a respective bounding box (304). Object detection module 120 of the false detection removal system 102 can apply bounding boxes to objects appearing within an image 108. Object detection module 120 can include one or more machine-learned models and/or classifiers to identify objects appearing within the image and apply bounding boxes around each of the objects. In some implementations, the object detection module 120 can receive images 108 with bounding boxes ascribed by object detection software 112 on camera 110.

The system determines false detection of an object from the set of objects detected in the image and utilizing ground truth labels (306). Ground truth labels 129 can be applied to the objects detected in the image 108, e.g., by a human expert. In some implementations, object recognition and clustering techniques can be applied to perform ground truth labeling in a semi-automatic or automatic manner. Ground truth labels 129 applied to each object can be utilized to categorize the object as either a target of interest, e.g., human, vehicle, etc., or a target not of interest, e.g., flag, mailbox, etc. Objects are determined by the system 102 to be targets not of interest, e.g., camera 110 is triggered to capture an image because of a target not of interest within the field of view of the camera 110, can be labeled by the system 102 as false alarm background objects 124 (FABOs). Images 108 where FABOs triggered the detection can be identified as false positive detections.

The system increments a target object count for the detected object determined as a false detection (308). As described with reference to FIGS. 2A and 2B, system 102 can increment a target object count for each detected object, e.g., FABO 124, that is determined to be a source of a false detection. In some implementations, as described with reference to FIG. 2A, target identification module 122 increments pixel counts for pixels in pixel regions corresponding to bounding boxes for the FABOs identified in the images that are false positive detections. For example, the target identification module 122 can increment pixel counts for pixels corresponding to a bounding box for a tree that is determined to be a FABO by increasing a corresponding pixel count stored for each pixel within the bounding box for the tree. In some implementations, as described with reference to FIG. 2B, target identification module 122 can increment a count associated with a candidate from a candidate list of objects 214 for which a bounding box of a FABO in an image that is a false positive detection overlaps with the candidate. For example, the target identification module 122 can increment a stored count for a tree from a list of candidate objects (e.g., bird feeder, mailbox, sprinkler, etc.) when the bounding box of the falsely detected object is determined to overlap with the bounding box of the tree.

In some implementations, incrementing the target object count (i.e., a number of false positive detections for the detected object) can be increasing the target object count by 1 such that each false positive detection increases the count by 1 (e.g., 0, 1, 2, 3 . . . etc.). In some implementations, incrementing the target object count can be increasing the target object count by a different integer, e.g., by 2, 3, n, etc. In some implementations, incrementing the target object count can be increasing the target object count by doubling the target object count for each false positive detection (e.g., from 2 to 4), or by multiplying the target object count by another value. In some implementations, incrementing the target object count can be decreasing the target object count for each false positive detection of the target object such that each false positive detection decreases the count by a value (e.g., decreases the count by 1).

Based on the target object count for the detected object meeting a target object threshold, the system generates an adversarial mask for the detected object (310). The system 102 can determine, for each detected object, that the detected object meets a target object threshold and provides target regions 128 for the target objects meeting the target object threshold to the adversarial mask engine 106 to generate an adversarial mask for the detected objects meeting the target object threshold. In some implementations, as described with reference to FIG. 2A, a set of representative bounding boxes, e.g., 20 bounding boxes, a top 5% of bounding boxes, or the like, corresponding to pixel regions 208 that meet a threshold criterion (e.g., a threshold pixel count), are overlapped and an area of overlap is determined as a target region 128.

In some implementations, as described with reference to FIG. 2B, average coordinates for the bounding boxes corresponding to candidates in the candidate list of objects that meet a target object threshold, e.g., a number of counts of appearance of the candidate in false positive detections, are utilized to determine a target region 128 for each candidate meeting the threshold.

Figure 3B:
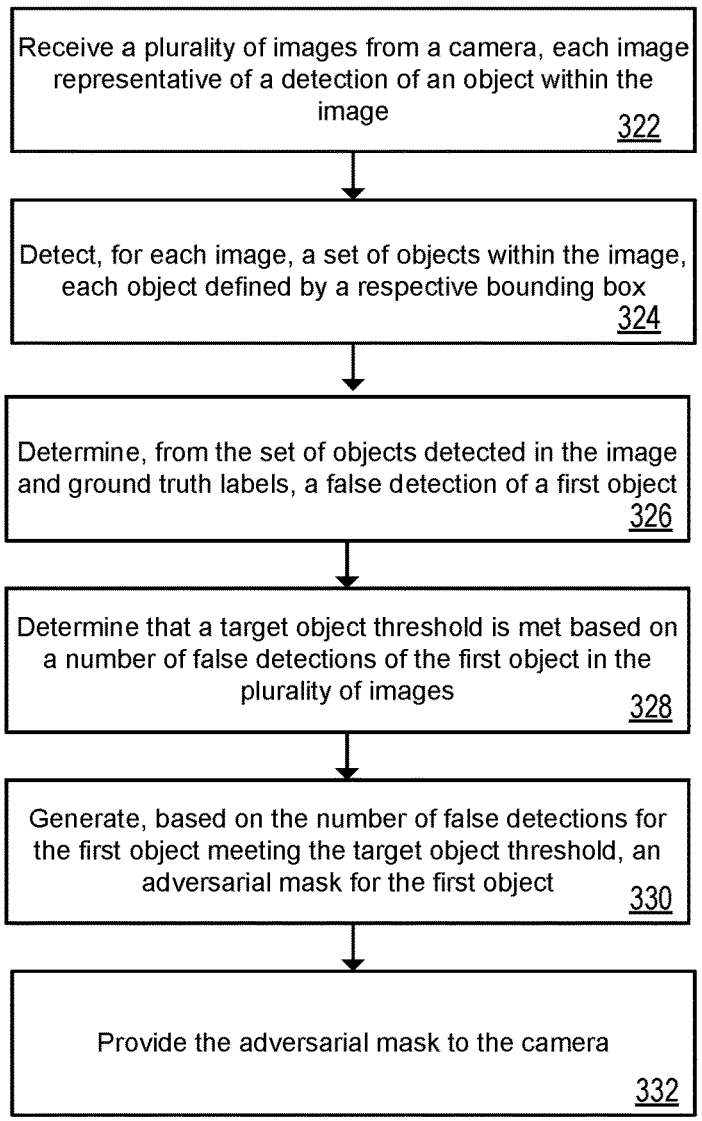
FIG. 3B is a flow diagram illustrating another example of a process of the adversarial mask system.

FIG. 3B is a flow diagram illustrating another example of a process 320 of the adversarial mask system. The system receives multiple images from a camera, each image representative of a detection of an object within the image (322). In some implementations, as depicted in FIG. 1, the system 102 receives multiple images 108 from camera 110, where each image 108 represents a detection of an object and/or event, e.g., person, animal, vehicle, etc., within the image 108. Images 108 can be stored in an image database 118, e.g., on a cloud-based server, and accessible by the system 102 via network 116.

In some implementations, one or more of the images 108 can be a representative image for a respective clip, e.g., video recording, by the camera 110. A representative image for a respective clip can be an image capturing one or more objects and/or events that triggered the capturing of the clip. In one example, camera 110 can be triggered to capture a clip by a person walking through the field of view of the camera 110, where a representative image for the clip includes the person in the frame.

The multiple images 108 can include false positive detections and true positive detections. A false positive detection can include where an object detected in an image is incorrectly detected, for example, where the camera is triggered to capture images/video clips by objects that are not of interest, e.g., a fountain, a mailbox, etc., within a field of view of the camera. A true positive detection can include an image where an object detected is correctly detected, for example, where the camera is triggered to capture images/video clips by an object of interest, e.g., a human, within the field of view of the camera. The objects within the images 108 can be identified by the object detection software 112 on camera 110, e.g., using multiple classifiers and/or machine-learned models.

For each image, the system detects a set of objects within the image, each object defined by a respective bounding box (324). Object detection module 120 of the false detection removal system 102 can apply bounding boxes to objects appearing within an image 108. Object detection module 120 can include one or more machine-learned models and/or classifiers to identify objects appearing within the image and apply bounding boxes around each of the objects. In some implementations, the object detection module 120 can receive images 108 with bounding boxes ascribed by object detection software 112 on camera 110.

The system determines false detection of an object from the set of objects detected in the image and utilizing ground truth labels (326). Ground truth labels 129 can be applied to the objects detected in the image 108, e.g., by a human expert. In some implementations, object recognition and clustering techniques can be applied to perform ground truth labeling in a semi-automatic or automatic manner. Ground truth labels 129 applied to each object can be utilized to categorize the object as either a target of interest, e.g., human, vehicle, etc., or a target not of interest, e.g., flag, mailbox, etc. Objects are determined by the system 102 to be targets not of interest, e.g., camera 110 is triggered to capture an image because of a target not of interest within the field of view of the camera 110, can be labeled by the system 102 as false alarm background objects 124 (FABOs). Images 108 where FABOs triggered the detection can be identified as false positive detections.

The system determines that a target object threshold is met based on a number of false detections of the first object in the plurality of images (328). As described with reference to FIGS. 2A and 2B, system 102 can track a number of false positive detections for each detected object, e.g., FABO 124, and compare the number of false positive detections for each detected object to a target object threshold. In some implementations, the system can determine that a number of false positive detections of an object (e.g., a bird bath within a field of view of the camera) meets or exceeds a target object threshold that is a total number of false positive detections. In some implementations, the system can determine that a number of false positive detections of the detected object compared to a total number of detections meets the target object threshold (i.e., a percentage of the total number of detections are false positive detections due to the detected object meets or exceeds a threshold value).

Based on the number of false detections for the first object meeting the target object threshold, the system generates an adversarial mask for the first object (330). The system 102 can generate, for each detected object meeting the target object threshold, an adversarial mask. Generating the adversarial mask can include providing target regions 128 for the target objects meeting the target object threshold to the adversarial mask engine 106 to generate an adversarial mask for the detected objects meeting the target object threshold. In some implementations, as described with reference to FIG. 2A, a set of representative bounding boxes, e.g., 20 bounding boxes, a top 5% of bounding boxes, or the like, corresponding to pixel regions 208 that meet a threshold criterion (e.g., a threshold pixel count), are overlapped and an area of overlap is determined as a target region 128.

In some implementations, as described with reference to FIG. 2B, average coordinates for the bounding boxes corresponding to candidates in the candidate list of objects that meet a target object threshold, e.g., a number of counts of appearance of the candidate in false positive detections, are utilized to determine a target region 128 for each candidate meeting the threshold.

The system provides the adversarial mask to the camera (332). The system 102 can provide the adversarial mask to the camera 110. The camera 110 can receive the adversarial mask and apply the adversarial mask to images captured to reduce a number of false detections of FABOs within a field of view of the camera 110.

Figure 4:
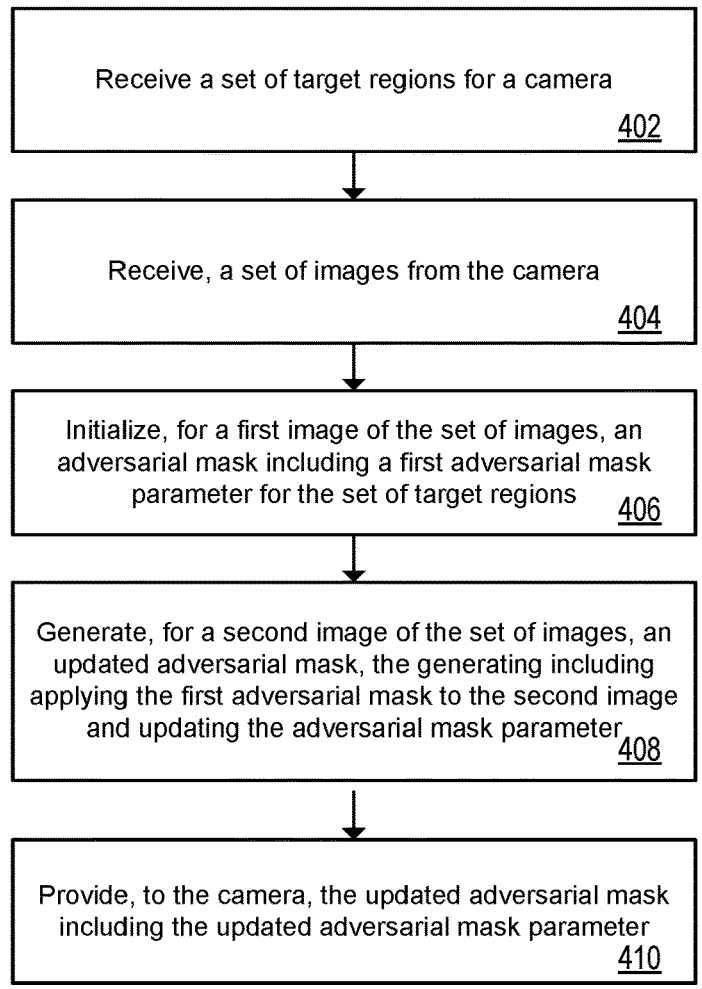
FIG. 4 is a flow diagram illustrating another example process of the adversarial mask system.

An adversarial mask for camera 110 can be generated from the target regions 128. The system 102 can perform an iterative optimization process that maximizes the removal of false positive detections while minimizing the impact on true positive detections. FIG. 4 is a flow diagram illustrating another example process of the adversarial mask system for generating and optimizing an adversarial mask for a camera.

The system receives a set of target regions for a camera (402). The adversarial mask engine 106 of the adversarial mask system 102 can receive the set of target regions 128 as input. Target identification engine 104 can provide the set of target regions 128 to the adversarial mask engine 106, where the target identification engine 104 generates the set of target regions 128 from a set of images 108 received from camera 110. Each target region 128 of the set of target regions 128 can define a pixel region including a set of pixels and coordinates for the pixel region, e.g., coordinates of the relative location of the pixels within the field of view of the camera 110. As described above, the target regions 128 represent regions within the field of view of the camera 110 that the system 102 determines are associated with false positive detections, e.g., due to false alarm background objects triggering detections by the camera 110.

The system receives a set of images from the camera (404). Camera 110 can provide test images 138 to the false detection removal system 102 via network 116. In some implementations, image database 118 can store images 108 from camera 110 and provide the test images 138 to the adversarial mask engine 106.

Test images 138 can include at least one image for each clip captured by the camera 110 over a period of time, e.g., a day, a week, two weeks. The test images 138 can include at least an overlap of the target regions 128 with true positive detection images and false positive detection images. In some implementations, test images 138 can include images captured under different imaging conditions, e.g., different lighting conditions, different weather conditions, different seasons. In one example, test images 138 can include 10 images, 100 images, 200 images, or the like.

For a first image of the set of images, the system initializes an adversarial mask including a first adversarial mask parameter for the set of target regions (406). The system 102 receives a first image 134 of the test images 138 and initializes an adversarial mask 136 including the first adversarial mask parameter. The initialized adversarial mask 136 includes a noise mask learnable parameter applied to the first image 134, where the noise mask includes modification to one or more pixels included in the target regions 128. To initialize the adversarial mask 136, the mask initialization module 130 calculates an altered version of the first image 134 using, for example, a fast gradient sign method (FGSM). Module 130 performs a forward pass and a backward pass on the adversarial mask 136 using FGSM to determine a gradient sign and then uses the gradient sign as an initialization value of the adversarial mask learnable parameter for the adversarial mask 136. The resulting gradient sign is cropped by the target regions 128.

In some implementations, the adversarial mask engine 106 can perform calculations related to computing the gradient of a loss function and the sign of the gradient of the loss function. For example, the calculation of the adversarial mask engine 106 can follow a form similar to $adv_x = x + \in *sign(\nabla_x J(\theta,x,y))$ where $adv_x$ is a resulting adversarially generated image or mask, x is an original input image, y is a label related to x that includes one or more false detections among the test images 138, $\in$ is used to control the level of perturbations applied to the original input image x, $\theta$ includes one or more model parameters for a model such as the object detection module 120, J is a loss function that operates on elements of the input image. As discussed above, the gradient, $\nabla_x$, is taken with regard to the loss function operating on elements of the system 102.

The adversarial mask engine 106 calculates noise based on the gradient sign calculated previously and a system defined parameter, $\in$. In some implementations, the adversarial mask engine 106 can additionally optimize an epsilon parameter $\in$, either as a separate learnable parameter or integrated in the adversarial mask learnable parameter. The system defined parameter can be user or programmatically set and controls a level of magnitude of noise generated based on the input image.

In some implementations, the epsilon parameter $\in$ can be set based on a number of times an end user reports a false positive, where the reported count can be utilized as an indication of a level of annoyance or how strongly the system should attempt to correct the issue causing the false positive detections, e.g. by increasing a level of noise being added. Conversely, if an end-user indicates that the system may be over-correcting and missing true positive detections, the epsilon parameter $\in$ can be adjusted to reduce a level of noise being added.

In some implementations, a large parameter $\in$ increases an amount of noise added to the test image. In other implementations, a different scale can be used to correlate the value of a parameter, such as $\in$, with a level of magnitude of noise generated based on the test image. For example, an $\in$ value of 1 may be correlated with a maximum level of noise and an $\in$ value of 0 may be correlated with a minimum level of noise. By changing $\in$, a resulting image including the adversarial mask can become more visually dissimilar compared to a test image used to create the adversarial mask.

In some implementations, a multiplicative operation can be used to combine E and the gradient sign within a calculation of noise. For example, a calculation containing elements corresponding to $\in$ multiplied by elements corresponding to a calculated gradient sign can be used to produce a level of magnitude of noise generated based on the input image. In some cases, a formula version of the calculation can resemble $\in *sign(\nabla_x)$ where $sign(\nabla_x)$ is a representation of gradient sign calculated and $\in$ is a user defined parameter controlling a level of magnitude of noise generated based on the input image.

In some implementations, a built-in gradient algorithm from a software library can be used to calculate the gradient sign. For example, the software library TensorFlow is an open source software library that can be used for dataflow, differentiable programming, or machine-learning based applications. Gradient and gradient sign functions from TensorFlow can be used to aid in the calculation of the gradient sign. In some implementations, other software libraries can be used. For example, platforms such as PyTorch or MXNet among others can be used within a system such as the system 102 shown in FIG. 1.

For a second image of the set of images, the system generates an updated adversarial mask, the generating including applying the adversarial mask to the second image and updating the adversarial mask parameter (408). Mask optimization module 132 applies adversarial mask 136 to the second image of the set of test images 138 and performs a forward pass and a backward pass. The mask optimization module 132 obtains an object detection loss, e.g., cross entropy, from the forward pass and backward pass, and utilizes the object detection loss to optimize the noise mask learnable parameter of the adversarial mask. Object detection loss can be calculated on a pixel-by-pixel basis, where a detection of an object is calculated per pixel used to detect the object. In one example, the mask optimization module 132 utilizes stochastic gradient descent (SGD) to obtain the object detection loss. The mask optimization module 132 utilizes the optimized noise mask learnable parameter to generate an updated adversarial mask 140.

In some implementations, step 408 is repeated for K images of the test images 138, e.g., 10 images, 100 images, 200 images. For each N image of the K images, the mask optimization module 132 adds a current updated adversarial mask 140 to the N image, and performs the forward pass and backward pass. The updated adversarial mask is optimized with the object detection loss calculated for the N image, e.g., using SGD, and the updated adversarial mask is updated. After K iterations are performed, the resulting updated adversarial mask 140 is changed by the mask optimization module 132 to a constant.

The noise is added to the input image in the form of value changes to elements of the input image such as pixels. The result of adding noise to the input image is an adversarial auxiliary image.

In some implementations, the adversarial mask engine 106 can iterate multiple times on a single image or on multiple images in batch. The updated adversarial mask 140 and epsilon values can be made target-region dependent, e.g., a different value is utilized for each target region 128. To generate a target-region dependent adversarial mask, the adversarial mask engine 106 can perform the same steps described above, but calculate the adversarial mask using different learnable parameters for each target region 128 that are learned independently and without relation between them.

In some implementations, the adversarial mask engine 106 can perform two backward passes in each iteration described above with reference to step 408 in order to calculate two losses, e.g., a first loss (with positive sign) for the detections with regard to the targets in order to maximize their effect, and a second loss (with negative sign) for the detections with regard to the ground truth labels (True Positives) to minimize the target effect on them. This can result in minimizing the effect on true positive detections.

In some implementations, the adversarial mask engine 106 can add a "visibility" factor in the loss calculation to avoid a loss computation when a false positive detection that needs to be removed is not present in a specific test image of a clip used for optimizing the adversarial mask. Additionally, a regularization parameter can be added in the optimization process, e.g., a "Mask Decay" parameter, that can correct the increments or decrements that each iteration does to the optimizable noise mask. Mask decay parameter can behave similarly to a "Weight Decay" parameter in a neural network training processes, for example, by adding a parameter to the loss that forces the trainable parameter e.g., the pixels of the adversarial mask, to be as close as possible to zero in order to reduce its impact.

The system provides, to the camera, the updated adversarial mask including the updated adversarial mask parameter (410). The adversarial mask engine 106 provides the updated adversarial mask 140 to the camera 110. Updated adversarial mask 140 is applied to new captured clips and/or images captured by the camera 110 to obtain an adversarial auxiliary image. The adversarial auxiliary image is a modified version of the captured images.

In some implementations, the adversarial auxiliary image is visually similar to the original portion of the captured image, e.g., can appear visually similar but be modified enough to alter the detections of the object detection software 112 of the camera 110. The amount of similarity can be controlled, in part, by the value of E discussed above.

Figure 5:
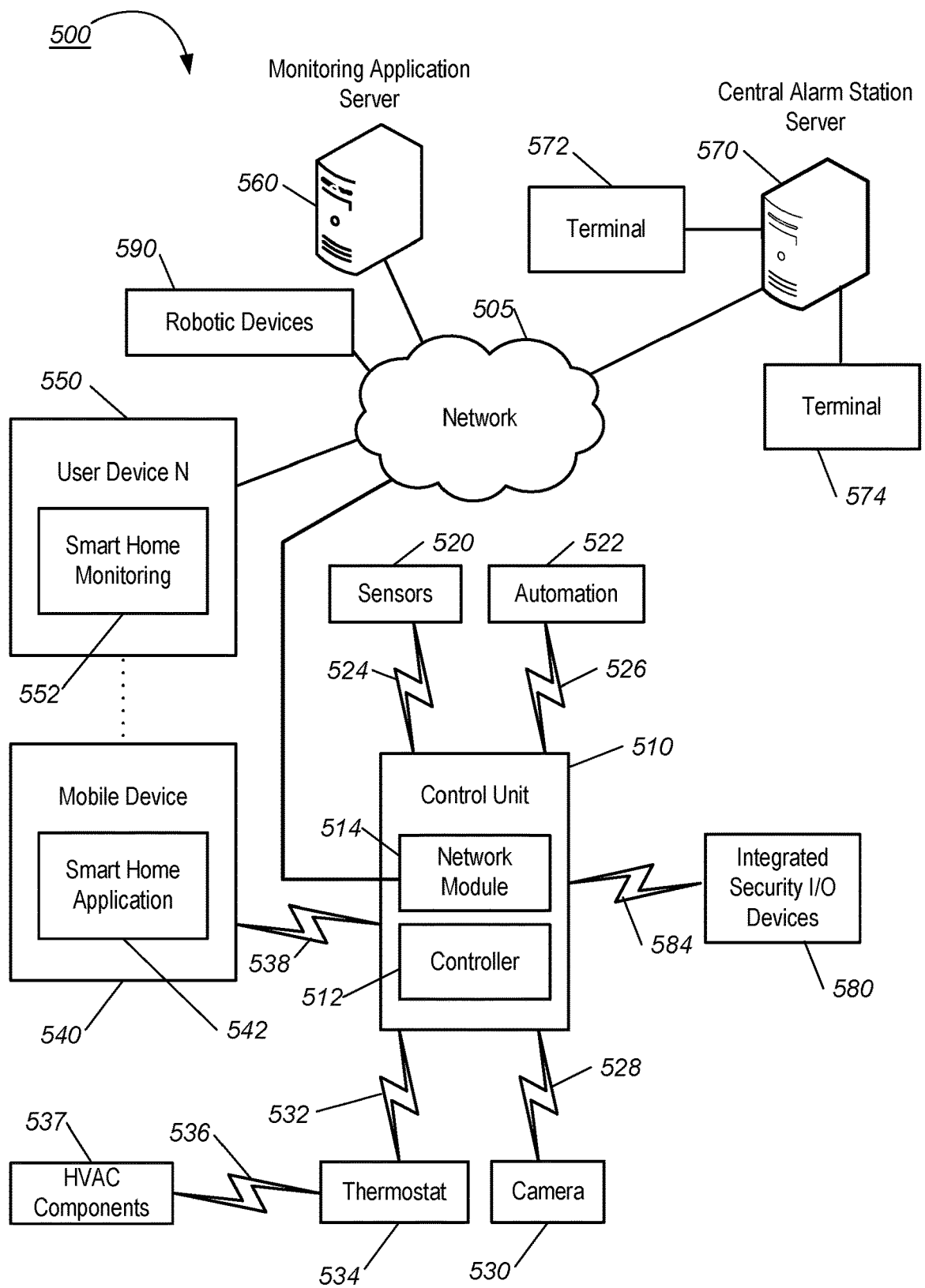
FIG. 5 is a diagram illustrating an example of a property monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., a user). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
receiving a plurality of images from a camera, each image of the plurality of images representative of a detection of an object within the image;
for each image of the plurality of images:
determining a set of detected objects within the image, each object defined by a respective bounding box; and
determining, from the set of detected objects within the image and ground truth labels, a false detection of a first object;
determining that a target object threshold is met based on a number of false detections of the first object in the plurality of images;
generating, based on the number of false detections for the first object meeting the target object threshold, an adversarial mask for the first object; and
providing, to the camera, the adversarial mask.

2. The method of claim 1, wherein determining that the target object threshold is met based on the number of false detections of the first object comprises, for each determined false detection of the first object:
incrementing a target object count for the first object within the image; and
determining the target object count for the first object meets a target object threshold.

3. The method of claim 2, wherein incrementing a target object count for the first object within the image comprises incrementing pixel counts for pixels in a pixel region corresponding to a bounding box defining the first object.

4. The method of claim 3, wherein determining the target object count for the first object meets the target object threshold comprises determining that pixels within the pixel region meet a threshold pixel count.

5. The method of claim 4, wherein generating, based on the target object count for the first object meeting the target object threshold, the adversarial mask for the first object comprises:
determining, based on the pixels within the pixel region meeting the threshold pixel count, a target region for the first object; and
generating the adversarial mask including the target region.

6. The method of claim 2, wherein incrementing a target object for the first object within the image comprises:
determining, from a plurality of candidate objects, a candidate object including a bounding box with a threshold overlap with a bounding box of the first object; and
incrementing a count for the candidate object.

7. The method of claim 6, wherein determining the target object count for the first object meets the target object threshold comprises determining the count for the candidate object meets a threshold count.

8. The method of claim 7, wherein generating, based on the target object count for the first object meeting the target object threshold, the adversarial mask for the first object comprises:
determining, based on bounding boxes corresponding to each appearance of the candidate object meeting the threshold count in the plurality of images, a target region for the candidate object; and
generating the adversarial mask including the target region.

9. The method of claim 1, further comprising:
receiving, from the camera, a second plurality of images;
applying, to a first image of the second plurality of images, the adversarial mask including an adversarial mask parameter, wherein applying the adversarial mask to the first image comprises modifying one or more pixels of the first image to generate a first auxiliary image;
determining, for the first auxiliary image, a gradient and a sign of the gradient;
generating, based on the gradient and the sign of the gradient and from the adversarial mask, an updated adversarial mask comprising:
applying the adversarial mask to a second image of the second plurality of images; and
updating the adversarial mask parameter; and
providing, to the camera, the updated adversarial mask.

10. A system comprising one or more computers and one or more storage devices on which are stored instructions that are operable, when executed by the one or more computers, to cause the one or more computers to perform operations comprising:
receiving a plurality of images from a camera, each image of the plurality of images representative of a detection of an object within the image;
for each image of the plurality of images:
determining a set of detected objects within the image, each object defined by a respective bounding box; and
determining, from the set of detected objects within the image and ground truth labels, a false detection of a first object;
determining that a target object threshold is met based on a number of false detections of the first object in the plurality of images;
generating, based on the number of false detections for the first object meeting the target object threshold, an adversarial mask for the first object; and
providing, to the camera, the adversarial mask.

11. The system of claim 10, wherein determining that the target object threshold is met based on the number of false detections of the first object comprises, for each determined false detection of the first object:
incrementing a target object count for the first object within the image; and
determining the target object count for the first object meets a target object threshold.

12. The system of claim 11, wherein incrementing a target object count for the first object within the image comprises incrementing pixel counts for pixels in a pixel region corresponding to a bounding box defining the first object.

13. The system of claim 12, wherein determining the target object count for the first object meets the target object threshold comprises determining that pixels within the pixel region meet a threshold pixel count.

14. The system of claim 13, wherein generating, based on the target object count for the first object meeting the target object threshold, the adversarial mask for the first object comprises:
determining, based on the pixels within the pixel region meeting the threshold pixel count, a target region for the first object; and
generating the adversarial mask including the target region.

15. The system of claim 11, wherein incrementing a target object for the first object within the image comprises:

determining, from a plurality of candidate objects, a candidate object including a bounding box with a threshold overlap with a bounding box of the first object; and incrementing a count for the candidate object.

16. The system of claim 15, wherein determining the target object count for the first object meets the target object threshold comprises determining the count for the candidate object meets a threshold count.

17. The system of claim 16, wherein generating, based on the target object count for the first object meeting the target object threshold, the adversarial mask for the first object comprises:

determining, based on bounding boxes corresponding to each appearance of the candidate object meeting the threshold count in the plurality of images, a target region for the candidate object; and generating the adversarial mask including the target region.

18. The system of claim 10, further comprising:

receiving, from the camera, a second plurality of images;

applying, to a first image of the second plurality of images, the adversarial mask including an adversarial mask parameter, wherein applying the adversarial mask to the first image comprises modifying one or more pixels of the first image to generate a first auxiliary image;

determining, for the first auxiliary image, a gradient and a sign of the gradient;

generating, based on the gradient and the sign of the gradient and from the adversarial mask, an updated adversarial mask comprising:

applying the adversarial mask to a second image of the second plurality of images; and updating the adversarial mask parameter; and providing, to the camera, the updated adversarial mask.

19. A non-transitory computer storage medium encoded with instructions that, when executed by one or more computers, cause the one or more computers to perform operations comprising:

receiving a plurality of images from a camera, each image of the plurality of images representative of a detection of an object within the image;

for each image of the plurality of images:

determining a set of detected objects within the image, each object defined by a respective bounding box; and determining, from the set of detected objects within the image and ground truth labels, a false detection of a first object;

determining that a target object threshold is met based on a number of false detections of the first object in the plurality of images;

generating, based on the number of false detections for the first object meeting the target object threshold, an adversarial mask for the first object; and providing, to the camera, the adversarial mask.

20. The computer storage medium of claim 19, further comprising:

receiving, from the camera, a second plurality of images;

applying, to a first image of the second plurality of images, the adversarial mask including an adversarial mask parameter, wherein applying the adversarial mask to the first image comprises modifying one or more pixels of the first image to generate a first auxiliary image;

determining, for the first auxiliary image, a gradient and a sign of the gradient;

generating, based on the gradient and the sign of the gradient and from the adversarial mask, an updated adversarial mask comprising:

applying the adversarial mask to a second image of the second plurality of images; and updating the adversarial mask parameter; and providing, to the camera, the updated adversarial mask.

* * * * *